United States Patent Office 3,308,164
Patented Mar. 7, 1967

3,308,164
1,3,5-TRICYCLOHEXYLBENZENE MONOHYDROPEROXIDE
Alvin F. Shepard, Grand Island, N.Y., assignor to Hooker Chemical Corporation, Niagara Falls, N.Y., a corporation of New York
No Drawing. Filed Feb. 23, 1966, Ser. No. 529,265
1 Claim. (Cl. 260—610)

This application is a continuation-in-part of my copending application SN 113,995, filed June 1, 1961; which is a continuation-in-part of my application SN 714,058 filed February 10, 1958, now U.S. 2,993,074, issued July 18, 1961; which in turn, was a continuation-in-part of my application SN 456,313, filed September 15, 1954, and now abandoned, which, in turn, was copending with my application SN 326,783, now U.S. Patent 2,790,010, issued April 23, 1957.

This invention relates to 1,3,5-tributylbenzene monohydroperoxide, 1,3,5-tricyclohexylbenzene monohydroperoxide, 3,5-dibutylphenol and 3,5-dicyclohexylphenol as new compositions of matter.

The hydroperoxides of this invention can be prepared by the oxidation of 1,3,5-tributylbenzene or 1,3,5-tricyclohexylbenzene in the presence of air or oxygen while the temperature of the hydrocarbon is maintained between about twenty-five and about two hundred and fifty degrees centigrade. The stream of air or oxygen is preferably dispersed with an orifice or similar device to provide good contact.

The phenols of this invention can be prepared by decomposing the hydroperoxides of tributylbenzene or tricyclohexylbenzene to the corresponding phenols and carbonyl compounds by reacting the hydroperoxides in a substantially anhydrous, homogeneous medium comprising a phenol and a small amount of a strong acid such as sulfuric acid, hydrogen chloride, aluminum chloride, halogenated carboxylic acid, or an organosulfonic acid, such as p-toluene-sulfonic acid monohydrate and phenolsulfonic acid. The amount of acid used may vary from 0.001 percent to one percent by weight, based on the weight of the hydroperoxide. The temperatures at which the decomposition is carried out may vary from the melting point of the reaction mixture to about the boiling point of the phenol. It is generally preferable but not required that the phenol which is used as the decomposition agent is the same phenol which is the resultant end product of the decomposition reaction, thereby simplifying the recovery of the product from the reaction mixture. The phenols of the invention can also be prepared by using a strong acid cata'yst of the type described hereinbefore, dissolved in a nonaqueous solvent such as glacial acetic acid.

The following example describes the preparation of 1,3,5-tri-secondary-butylbenzene hydroperoxide and 3,5-dibutylphenol starting with the basic raw materials, benzene and butene-2.

Example 1

1,3,5-tri-secondary-butylbenzene was prepared by reacting one mole of benzene and three moles of butene-2 in the presence of 0.07 mole anhydrous aluminum chloride at seventy to eighty degrees centigrade. After decomposition of the aluminum chloride complex in the usual way, the product was subjected to fractional distillation and yielded 0.4 mole of 1,3,5-tri-secondary-butylbenzene, boiling from one hundred and thirty-six to one hundred and thirty-seven degrees centigrade at twelve millimeters of mercury absolute pressure and having a density of $d_4^{25}$ 0.843 and a refractive index of $n_D^{25}$ 1.4805. The positioning of the butyl groups was established by oxidation of the hydrocarbon with a mixture of sodium dichromate and $H_2SO_4$ which yielded trimesic acid, which was identified by its melting point and by conversion of its methyl ester.

The tributylbenzene was partially peroxidized by heating it to one hundred and sixty degrees centigrade and passing oxygen through it for forty-five minutes. The oxidation product contained 22.5 percent of the hydroperoxide.

To thirty grams of 1,3,5-tributylbenzene oxidate were added fifty milliliters of Claisen alkali. The mixture was shaken in a one hundred and twenty-five milliliter separatory funnel. The alkali layer was separated, washed twice with cyclopentane, and then diluted to four hundred milliliters with water. The diluted solution was neutralized with acetic acid and the liberated hydroperoxide was extracted from the water with cyclopentane. The cyclopentane layer was washed with water until neutral, dried over $MgSO_4$, and the solvent was evaporated off under vacuum. Analysis (iodometric) indicated 100.6 percent tri-secondary-butylbenzene monohydroperoxide. The hydroperoxide had $n_D^{25}$ 1.50086 and $d_4^{25}$ 0.9566; molecular refraction, calculated 86.00; found 85.74. Calculated values were values given by Rieche in "Alkyd Peroxyde und Ozonide," Verland von Theodor Steinkopf, 1931, Leipzig und Dresden, and by Verhulst, Rec. trav. chim. 54, 518 (1935).

An eighty-two gram portion of the oxidate was cleaved by adding it to 0.86 gram concentrated sulfuric acid in thirty cubic centimeters of glacial acetic acid and reacting for about one hour at fifty-five degrees centigrade to disappearance of hydroperoxide. The cleavage product was then washed with water. By extraction of the washed cleavage product with Claisen alkali, neutralization with dilute hydrochloric acid and distillation under vacuum, crude 3,5-dibutyl phenol was obtained. On recrystallization, the 3,5-di-secondary-butyl phenol melted at forty-five to forty-six degrees and combustion analysis showed C 81.9, 81.6 percent; H 10.98, 11.00 percent (calculated for dibutyl phenol C 81.55 percent; H 10.67 percent). By distillation of the cleavage product prior to washing the extraction and treatment of the distillate with 2,4-dinitrophenlyhydrazine, methyl ethyl ketone was obtained in the form of its 2,4-dinitrophenylhydrazone.

The following example describes the preparation of 3,5-dibutyl phenol using the method of application SN 714,058, now U.S. 2,993,074.

Example 2

Twenty parts of phenol containing 0.10 gram of ninety-six percent sulfuric acid are heated to a temperature of about fifty degrees centigrade and fifty grams of dibutylbenzene hydroperoxide prepared in accordance with Example 1 are added dropwise over a period of fifteen minutes. The reaction mixture is cooled and stirred for an additional one-helf hour to allow completion of the reaction, after which the 3,5-di-secondary-butyl phenol is recovered from the reaction mixture by extraction and distillation.

The following example describes the preparation of a phenol aldehyde resin using 3,5-dibutyl phenol.

Example 3

To 28.9 grams of 3,5-di-secondary-butyl phenol (0.14 mole) and 0.5 gram oxalic acid at ninety degrees centigrade, are added 6.8 grams (0.084 mole) of a thirty-seven percent formaldehyde solution at such a rate that the mixture refluxes vigorously. After completion of the formalin addition, the resin is refluxed for four hours, after which it is dehydrated and then dephenolated at two hundred degrees centigrade and fifty millimeters pressure. The resulting product is a light-colored, hydrocarbon soluble resin and is used in the preparation of a drying oil varnish.

The following example describes the preparation of 1,3,5- tricyclohexylbenzene hydroperoxide and 3,5-dicyclohexyl phenol.

Example 4

1,3,5-Tricyclohexylbenzene (melting point 71.8 to seventy-two degrees centigrade), the preparation of which is described by Corson and Ipatieff, J.A.C.S. 59, 645 (1937), per peroxidized at one hundred to one hundred and fifteen degrees centigrade by bubbling air through it for thirty hours. The product contained 8.9 percent of the hydroperoxide.

Forty grams of the hydroperoxide were extracted with Claisen alkali. The alkali solution was neutralized with acetic acid and diluted with water. A crystalline solid was thus obtained; it was filtered off, washed with water and recrystallized from cyclopentane to a melting point of two hundred to two hundred and one degrees Centigrade (decomposition). Analysis showed C 77.96 percent; H 9.4 percent; calculated analysis for 3,5-dicyclohexylbenzene monohydroperoxide is C 80.85 percent; H 10.18 percent.

Using a procedure similar to that described in Example 1, forty grams of the hydroperoxide were decomposed with a solution of 0.06 gram of concentrated sulfuric acid and the phenolic product was extracted. The phenolic product, after two crystallizations from petroleum ether melted at one hundred and fifteen to 115.5 degrees Centigrade and contained C 82.09 percent; H 10.34 percent; calculated analysis for 3,5-dicyclohexyl phenol is C 83.7 percent; H 10.07 percent. By distillation of the cleavage solution remaining after the alkaline extraction and treatment of the distillate with 2,4-dinitrophenylhydrazine, there was obtained cyclohexanone in the form of its 2,4-dinitrophenylhydrazone, melting point one hundred and sixty-two to one hundred and sixty-three degrees Centigrade alone and in mixture with authentic material (mixed melting point).

The following example describes the preparation of 3,5-dicyclohexyl phenol using the method of application Serial No. 714,058, now U.S. 2,993,074.

Example 5

Twenty parts of phenol, containing 0.10 gram of ninety-six percent sulfuric acid, are heated to a temperature of about fifty degrees Centigrade and fifty grams of tricyclohexylbenzene hydroperoxide prepared in accordance with Example 4 are added dropwise to the phenol over a period of fifteen minutes. The reaction mixture is cooled and stirred for an additional one-half hour to allow completion of the reaction, after which the 3,5-dicyclohexyl phenol is recovered from the reaction mixture by extraction and distillation.

The following example describes the preparation of a resin, using 3,5-dicyclohexyl phenol.

Example 6

To 36.1 grams (0.14 mole) of 3,5-dicyclohexyl phenol and 0.5 gram oxalic acid at ninety degrees Centigrade, are added 6.8 grams (0.084 mole) of a thirty-seven percent formaldehyde solution at such a rate that the mixture refluxes vigorously. After completion of the formalin addition, the resin is refluxed for four hours, after which it is dehydrated and then dephenolated at two hundred degrees Centigrade and fifty millimeters pressure. The resulting product is a light-colored, hydrocarbon soluble resin and is used in the preparation of a drying oil varnish.

As shown in Examples 3 and 6, the phenols of this invention are useful in the preparation of phenol-aldehyde resins. The compounds and resins produced therefrom are also useful as anti-oxidants in gasolines, lubricating oils and synthetic polymers, such as in synthetic rubbers. They are also useful in the preparation of methylol compounds for use as vulcanizing agents for synthetic rubber such as the conventional SBR rubbers as well as butyl rubber. The compounds are also useful as intermediates in the preparation of pesticides and in particular, insecticides, miticides and nematocides.

In addition to use as intermediates in the preparation of phenols, the hydroperoxides of the invention can be used as polymerization catalysts for butadiene polymers, acrylate polymers and the like. They can be used to promote the curing of polymers such as polyesters, alkyds and diallyl phthalate resins. Other uses are as bleaching agents and germicides, and additives to regulate the combustion of motor and jet fuels.

Having thus described my invention, I claim:
1,3,5-tricyclohexylbenzene monohydroperoxide.

References Cited by the Examiner
UNITED STATES PATENTS
2,664,447  12/1954  Lorand _____ 260—610

LEON ZITVER, *Primary Examiner.*

W. B. LONE, *Assistant Examiner.*

UNITED STATES PATENT OFFICE
CERTIFICATE OF CORRECTION

Patent No. 3,308,164                             March 7, 1967

Alvin F. Shepard

It is hereby certified that error appears in the above numbered patent requiring correction and that the said Letters Patent should read as corrected below.

Column 1, line 68, for "centrigrade" read -- centigrade --; column 2, line 28, for "0.86" read -- 0.06 --; column 3, lin 10, for "per" read -- was --.

Signed and sealed this 9th day of January 1968.

(SEAL)
Attest:

Edward M. Fletcher, Jr.

Attesting Officer

EDWARD J. BRENNER
Commissioner of Patents